United States Patent
Neber et al.

(10) Patent No.: US 6,516,585 B2
(45) Date of Patent: Feb. 11, 2003

(54) TREATMENT MACHINE IN PARTICULAR FOR PHARMACEUTICAL PRODUCTS, PARTICULARLY FILLING AND CLOSING MACHINE

(75) Inventors: Fritz Neber, Schwaebish Hall (DE); Rupert Miksch, Satteldoef (DE); Joachim Schmid, Wallhausen (DE)

(73) Assignee: Groninger & Co. GmbH, Crailsheim (DE)

( * ) Notice: Subject to any disclaimer, the term of this patent is extended or adjusted under 35 U.S.C. 154(b) by 0 days.

(21) Appl. No.: 09/896,002

(22) Filed: Jun. 29, 2001

(65) Prior Publication Data
US 2002/0043904 A1 Apr. 18, 2002

Related U.S. Application Data

(63) Continuation-in-part of application No. 09/306,618, filed on May 4, 1999, now abandoned.

(30) Foreign Application Priority Data

May 13, 1998 (DE) .......................... 198 21 280

(51) Int. Cl.⁷ .......................... B65B 55/02; B65B 55/00
(52) U.S. Cl. .................... 53/167; 134/104.1; 422/300
(58) Field of Search .......................... 53/167; 422/291, 422/292, 300; 173/198, 199; 134/104.1, 166 R

(56) References Cited

U.S. PATENT DOCUMENTS

| | | | | |
|---|---|---|---|---|
| 4,803,827 A | * | 2/1989 | Posey et al. | 53/167 |
| 4,944,132 A | * | 7/1990 | Carlsson et al. | 422/24 |
| 5,127,416 A | * | 7/1992 | Wakabayashi et al. | 134/104.1 |
| 5,199,591 A | * | 4/1993 | Kluber et al. | 173/171 |
| 5,246,502 A | * | 9/1993 | Matthews et al. | 134/102.1 |
| 5,402,621 A | * | 4/1995 | Weiss | 53/167 |

\* cited by examiner

*Primary Examiner*—M. D. Patterson
(74) *Attorney, Agent, or Firm*—Michael J. Striker

(57) ABSTRACT

A treatment machine for pharmaceutical products formed as a filling and closing machine has an insulator which surrounds a sterile treatment region, a substantially plate-shaped partition which separates the sterile treatment region from an unsterile drive region, at least one movable drive member for driving treatment functions, the drive member is drivable from the unsterile region for its movement, extends through the partition into the sterile treatment region and is surrounded over at least one longitudinal portion by a passage through which a medium is supplied, the passage in an end region which extends in the sterile treatment region is open by at least one opening toward the sterile treatment region, so that a sterilization medium is aspirated from the sterile treatment region through the at least one opening into the passage and is aspirated through the passage in direction toward the unsterile drive region.

35 Claims, 3 Drawing Sheets

TREATMENT MACHINE IN PARTICULAR FOR PHARMACEUTICAL PRODUCTS, PARTICULARLY FILLING AND CLOSING MACHINE

CROSS REFERENCE TO A RELATED APPLICATION

This application is a continuation-in-part of application Ser. No. 09/306,618 filing date May 4, 1999 abandoned.

BACKGROUND OF THE INVENTION

The present invention relates to a treatment machine, in particular for pharmaceutical products, particularly a filling and closing machine.

In machines of this type, a machine in connection with a well is known, which is used with a sterile liquid passing through a valve chamber and a valve spindle extends in the valve chamber and is provided at its end with a valve closing member. In such a valve, there is a danger during the operation that bacteria can reach from the unsterile region to the valve spindle, and during the valve stroke they reach the valve chamber and thereby the sterile liquid which is provided in it. In order to prevent such a situation, the German document D-OS2002 464 discloses that the region of the valve spindle located outside of the valve housing can be surrounded by a tube, and a passage is formed between the tube and the spindle and sealed at both ends by seals relative to the valve spindle. Hot water or steam are introduced as a medium at one end into this ring passage, and withdrawn at the other end of the passage. The medium guided in the passage is therefore completely different than the medium, for example the sterile medium, in the valve chamber, which is sealed by a seal to the passage.

Such a known machine is not usable for filling and closing machines, in particular for pharmaceutical area, in which the unsterile region, for example the drive region, or machine region is provided at one side of the partition and the sterile region, for example filling and closing region, is provided on the other side of the partition. The movable drive member moves through the partition between both regions. Therefore there is a danger that individual particles or germs can be dropped from the unsterile region over the movable drive member into the sterile region.

SUMMARY OF THE INVENTION

Accordingly, it is an object of the present invention to provide a machine between an unsterile region and a sterile region, which avoids the disadvantages of the prior art.

In keeping with these objects and with others which will become apparent herein after, one feature of present invention resides, briefly stated, in a treatment machine for pharmaceutical products formed as a filling and closing machine, comprising an insulator which surrounds a sterile treatment region; a substantially plate-shaped partition which separates the sterile treatment region from an unsterile drive region; at least one movable drive member for driving treatment functions, said drive member being drivable from said unsterile region for its movement, extends through said partition into the sterile treatment region and is surrounded over at least one longitudinal portion by a passage through which a medium is supplied, said passage in an end region which extends in the sterile treatment region being open by at least one opening toward the sterile treatment region, so that a sterilization medium is aspirated from the sterile treatment region through said at least one opening into said passage and is aspirated through said passage in direction toward the unsterile drive region.

When the machine is designed in accordance with the present invention, then from the sterile region in direction toward the unsterile region around the drive member, a desired suction in direction toward the unsterile region is performed, so that the possibility is excluded of dragging particles against the flow direction into the sterile space. The machine with such a machine in accordance with the present invention is reliable in operation. It not only makes impossible dragging particles from the unsterile region into the region of the passage and toward the sterile region, but also simultaneously it is such that during the sterilization in the sterile region which is performed at the beginning of operation of the machine, a penetration of the sterilization medium, for example an $H_2O_2$-air mixture in the unsterile region is prevented, so that simultaneously during the sterilization a sterilization is guaranteed in the region of the passage and thereby the outer surface of the drive member.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
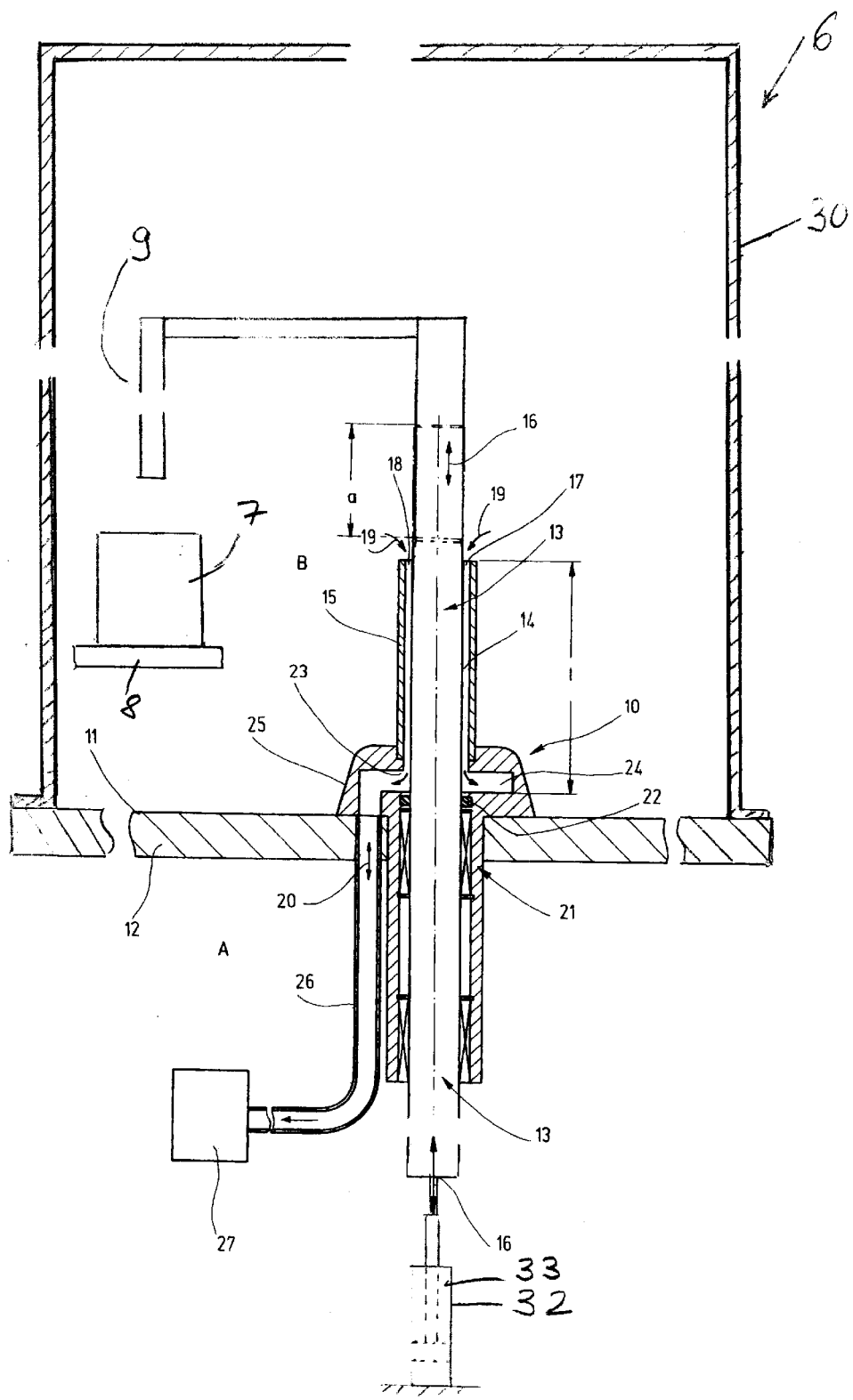
FIG. 1 is a view schematically showing a section of a treatment machine for pharmaceutical products in accordance with one embodiment of the present invention.

FIG. 1 schematically shows a treatment machine 6 which is used in particular for treatment of pharmaceutical products 7, for example for filling and/or closing such products 7. The products 7 are transported by a transporting device 8, for example a conveyor band, for example in steps and supplied to a treatment head 9 which is composed for example of a known filling device and/or closing device. The treatment machine 6 has a partition 11 which extends here substantially horizontally and formed for example as a plate 12 with a substantially bell-shaped cap 25. An insulator 30 which is also substantially bell-shaped as a hood is tightly placed on the substantially bell-shaped cap 25. Together with the partition 11 it encloses a sterile region B. The sterile region B is a treatment region. Under the partition 11, a lower, unsterile region A is located and represents a drive region. A machine 10 is located between both regions A and B to separate them from one another.

A movable drive member 13 extends through the partition 11, in particular through the plate 12 and the cap 25. It is formed for driving the treatment functions, for example the filling and/or closing functions. It is drivable from the unsterile region A to perform its movement, through the sterile region B. The drive member 13 is surrounded at least over its portion by a passage 14, through which a medium can be supplied. A tube 15 is provided for forming the passage 14 and it is tightly closed on the cap 25 and surrounds the drive member 13. The passage 14 is formed between the tube 15 and the outer side of the drive member 13. The drive member 13 is formed for example as an elongated part. The passage 14 which surrounds the drive member 13 is formed as a ring passage.

Figure 2:
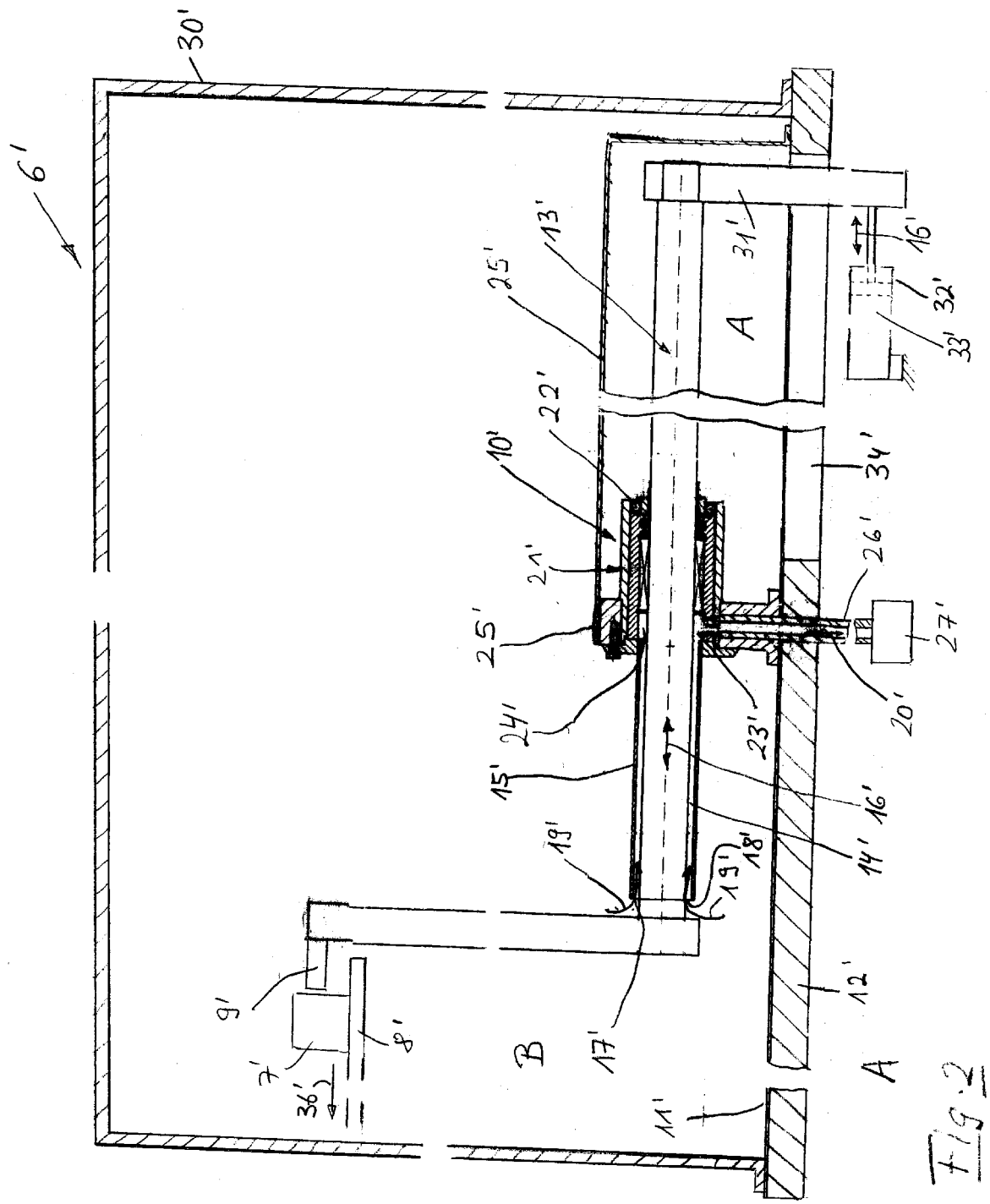
FIG. 2 is a view schematically showing a section of a treatment machine for pharmaceutical products in accordance with another embodiment of the present invention.

In FIGS. 1 and 2 the drive member 13, 13' is formed for example as a stroke member which is driven translatorily in the direction of the arrow 16, 16', for example a lifting spindle. The maximum stroke is identified as A. The treatment machine 6 shown in FIG. 1 is form example an aseptic filling and closing machine. The insulator 30 is used for forming and maintaining the sterile region B above the plate 12 with the cap 25, to protect the sterile filling and closing region B from contamination by the unsterile region A located under it, for example from the remaining machine region, in particular a drive region. The drive member 13, 13' is translitorily drivable in FIGS. 1–3 in direction of the arrow 16, 16' from the unsterile region A. A schematically shown drive 32, 32' is located there, and formed for example as a pneumatic or hydraulic working cylinder 33, 33', for a reciprocating driving of the drive member 13, 13', to perform the required functions in the treatment region B.

The treatment functions in FIG. 1 are the functions for filling and/or closing of the product 7. In FIG. 2, these treatment functions include transportation of the product 7' by the treatment head 9' in the horizontal direction in accordance with arrow 36' on a base 8', for example by displacement. A turning action of the drive member 13' which is hollow in FIG. 3 can be superimposed on it in direction of arrow 16", for superimposed turning transportation of the product. During the operation the drive member 13, 13' is reciprocatingly movable between the unsterile region A under the plate 12 and the sterile filling and closing region B located above it.

If the sealing is not good enough, it is not excluded in known treatment machines that individual particles or germs can be dropped between the drive member 13 and a corresponding seal from the unsterile region B into the sterile region A. For reliably preventing this situation, in accordance with the embodiment of FIG. 1 the passage 14 at an end region 17 which extends through the sterile region B is open through at least one opening 18 to the sterile region B. A medium, for example during the start of production a sterilization medium and during the production a protective medium for example air, is guided into the passage 14 through the at least one opening 18 from the sterile region B in direction of the arrow 19 into the passage 14. With the pressure drop in direction toward the unsterile region A, it passes through the passage 14 in the arrow direction 20. Therefore, a desired suction of air from the sterile region B in direction of the arrows 19 and 20, to the unsterile region A is performed. Thus, the possibility is excluded that the particles can be derived against the flow of the medium from the unsterile region A into the sterile region B.

The inner diameter of the tube 15 is insignificantly greater than the outer diameter of the drive member 13. At least one opening 18 of the passage 14 is formed as a ring opening at the end of the tube 15. The passage 14 is formed as a ring passage, in particular a ring gap. It is important for the lifting plunger 13, 13' in FIGS. 1–3 that the length of the passage 14 which is identified with reference I is greater than the maximum stroke a of the drive member 13, 13' formed as the lifting spindle.

The passage 14 is sealed to the end region which is opposite to the opening 18, by means of at least one sealing device 21. The sealing device 21 encloses the drive member 13. At least one sealing device 21 has at least one sliding ring seal 22. The passage 14 is provided with at least one opening 23 in the end region which is opposite to the opening 18 and proceeds the sealing device 21. The medium which passes through the passage 14 is aspirated through the opening 23. The opening 23 opens into a ring chamber 24 which is limited by for example the ring-shaped cap 25. The cap 25 sits tightly on the plate 12. A schematically shown conduit 26 of a schematically shown vacuum generator 27 is connected or connectable to the opening 23 in particular to the ring chamber 24.

In the shown embodiment the partition 11 is formed as a horizontally extending plate 12. It is of course understood that in accordance with another, not shown embodiment, the partition 11 can be formed differently. For example it can be formed as a vertical or inclined plate. The drive member 13, in particular the elongated member, in FIG. 1 extends transversely to the plate 12, for example substantially at a right angle. In the second and third embodiments of FIGS. 2 and 3, the drive member 13' instead is oriented substantially parallel to the plate 12' and is arranged partially in a substantially tunnel-shaped cap 25' which is tightly mounted on the plate 12'. For the translatory drive of the drive member 13', a connection member 31' is provided. It extends in the unsterile region A through an opening 34', for example a longitudinal slot shown in FIG. 2 or a transverse slot shown in FIG. 3, in the plate 12' through it into the inner space of the cap 25'. There it engages the connecting member 31' under the plate 12' of the drive 32'.

Figure 3:
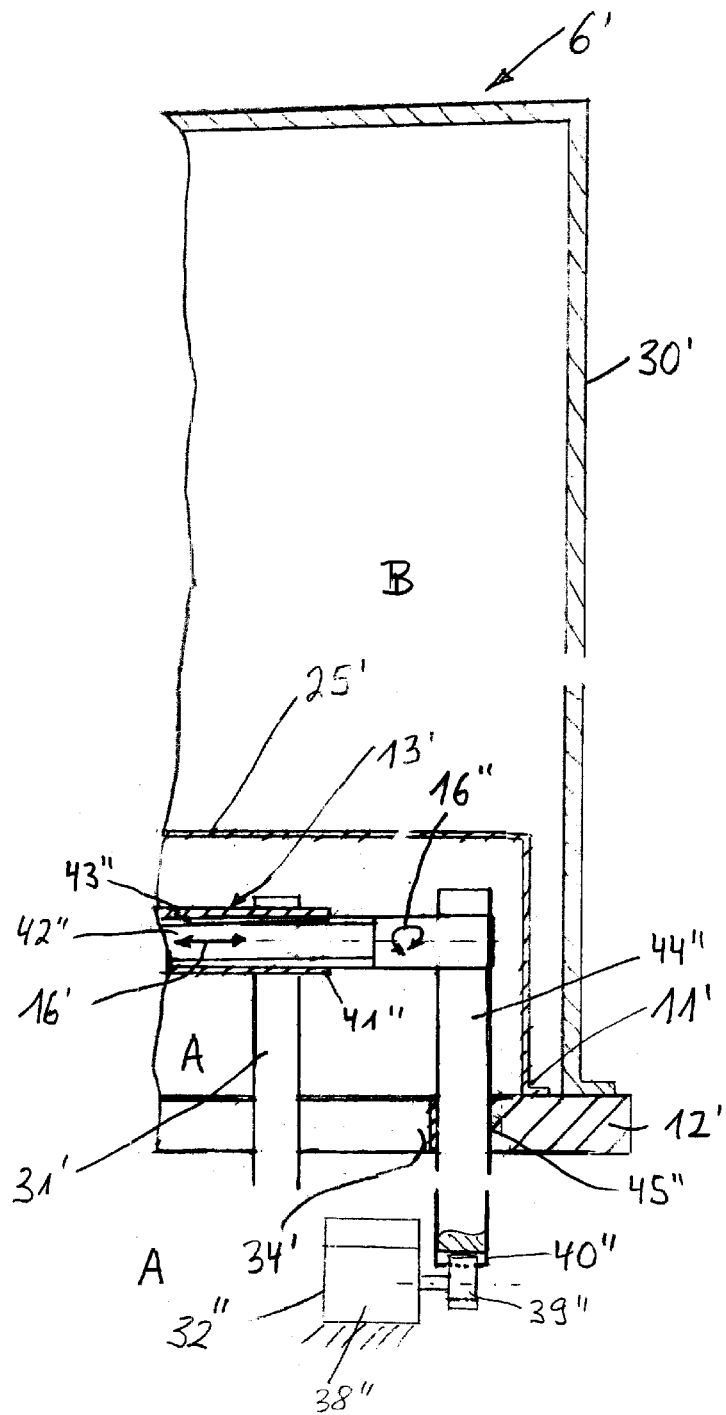
FIG. 3 is a view schematically showing a section of a treatment machine for pharmaceutical products in accordance with a further embodiment of the present invention.

For sterilization of the insulator 30, 30' in FIGS. 1–3 and the sterile region B, before the start of production, a sterilization medium, for example $H_2O_2$-air mixture is supplied in the region B. The sterilization medium can not pass through the partition 11, 25 or 11', 25' into the unsterile region A. During the sterilization, continuously air is aspirated from the sterile region B through the passage 14, 14' in direction of the arrow 19, 20, 19', 20' so that in this region also a sterilization is guaranteed. Furthermore, due to this aspiration of the sterilization medium it is also guaranteed that it can not reach the surrounding region. When desired, the sterilization medium which is aspirated through the conduit 26, 26' can be returned back.

In any case, it is guaranteed that the sterilization medium can not flow in the chamber 8 or in the chamber where people are located. On the other hand, with this sterilization, it is guaranteed that the interior of the tube 15, 15' and the outer side of the drive member 13, 13' in the course of the passage 14, 14' are sterilized and thereby a reliable decontamination is provided there.

In operation of the machine 10, 10', a laminar flow of the protective medium, for example air directed against the plate 12, 12' acts in the sterile region B. Such air flows are used to maintain the particles or germs from a propagation into spaces. The laminar air flow over the plate 12, 12' is performed for example in the magnitude of 0.45 m/s. Thereby some produced particles are held far from the opening of the objects to be treated in the treatment region or are aspirated. The air for a laminar flow is first guided through a high efficiency flowed filter, so that a high particle minimization in the air is guaranteed. The flow above the plate 12, 12' in FIG. 1 is oriented substantially parallel to the longitudinal extension of the passage 14, 14' to its opening 18, and in FIGS. 2 and 3 is oriented substantially transversely to the longitudinal extension of the passage 14, 14'. In particular, it is oriented so that in this region, at least a part of the protective medium, for example air, is aspirated through the opening 18, 18' and the passage 14, 14', and in the region of the tube 14, 14' and the cap 25, 25' at least one turbulent free region is provided.

During the production, particles or germs can be dragged on the outer surface of the drive member 13, 13' through the sealing device 21, 21' from unsterile region A. However, the contaminated outer surface remains during the maximal stroke A almost inside the region of the tube 15, 15', since the length L of the passage 14, 14' is greater than the maximum stroke A. If the particles or germs which are introduced in the region of the passage 14, 14' are released from the contaminated surface of the drive member 14, 14', for example due to vibrations or similar actions, they can not reach the sterile region B, since the air flow in the passage 14, 14' is aspirated through the intentionally provided aspiration of such particles or germs.

Frequently, the drive member 13, 13', in particular the lifting plunger, is located in the center of the plate 12, 12'. By the aspiration through the opening 18, 18' and the passage 14, 14', a part of the air flow striking on the plate 12, 12' is aspirated directly through the opening 18, 18'. Thereby air piling or whirling can be produced there are prevented. The formation of a stabile air guide close to above the upper side of the plate 12 is thereby further improved.

In the embodiments of FIGS. 2 and 3 the parts which correspond to the parts in the embodiment of FIG. 1 are identified with the same reference numerals, but with addition of a prime to avoid repetition of the description of the embodiment of FIG. 1.

In the embodiment of FIG. 2, the drive member 13' extends substantially parallel to the plate 12' and is reciprocatable parallel to the direction of the arrow 16' by means of the drive 32', which for this purpose engages the connection member 31'. The partition 11' is composed here of the plate 12' and the substantially tunnel-shaped gap 25' which is arranged tightly on the plate 12'. The tube 15' is connected to the left end of the tunnel-shaped cap 25' in FIG. 2. The drive member 13' extends substantially parallel to the longitudinal extension of the cap 25'. It actuates a transporting head 19' for transportation of the product 7', for example in direction of the arrow 36' on a base 8', for example a transporting device and the like.

The machine 6' of FIG. 3 is substantially similar to the machine of FIG. 2. The drive member 13' is however placed in direction of the arrow 16' parallel to the plate 12' and when needed is turnable in direction of the arrow 16" about its longitudinal axis. Thereby a not shown product is transported with superposition also in the turning direction. The connection member 31' and the drive 32' are formed as in FIG. 2. The drive member 13' is however formed as a hollow tube 41" in which a rod 42" which serves for the turning drive extends. The rod 42" is connected with the hollow tube 41" so as to transmit torque and to be relatively displaceable, for example by a schematically shown wedge 43" on the rod 42". It cooperates with the corresponding wedge or groove and the like of the radial abutment in the interior of the tube 41", so that the tube 41" is transitorily displaceable in direction of the arrow 16' relative to the immovable rod 42" and when necessary is turnably actuatable by the rotary actuation of the rod 42" also in direction of the arrow 16" around its longitudinal axis.

The connection member 33' which engages non-rotatably the tube 41", extends as shown in FIG. 2 from the interior of the cap 25' through an opening 24' in the plate 12' downwardly to the drive 32', as shown in FIG. 2. The same arrangement is provided in FIG. 3.

For turning action of the rod 42', a further connecting member 44" is provided which non-rotatably engages the rod. It extends through an opening 45" in the plate 12' downwardly to a drive 32". The drive includes for example a motor 38" with a tooth gear 39" which engages a peripheral tooth set 40" on the connection member 44". Instead, also other forms of a drive 32" for the turning action of the rod 42" can be used, such as for example a drive formed as rods, levers and the like which articulatingly engage the rod 42" or the connecting member 44".

It will be understood that each of the elements described above, or two or more together, may also find a useful application in other types of constructions differing from the types described above.

While the invention has been illustrated and described as embodied in treatment machine, in particular for pharmaceutical products, particularly a filling and closing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A treatment machine for pharmaceutical products formed as a filling and closing machine, comprising an insulator which surrounds a sterile treatment region; a substantially plate-shaped partition which separates the sterile treatment region from an unsterile drive region; at least one movable drive member for driving treatment functions, said drive member being drivable from said unsterile region for its movement, extends through said partition into the sterile treatment region and is surrounded over at least one longitudinal portion by a passage through which a medium is supplied, said passage in an end region which extends in the sterile treatment region being open by at least one opening toward the sterile treatment region, so that a sterilization medium is aspirated from the sterile treatment region through said at least one opening into said passage and is aspirated through said passage in direction toward the unsterile drive region.

2. A machine as defined in claim 1, wherein said sterilization medium is a mixture of H2O2 with air.

3. A machine as defined in claim 1, wherein a pressure drop is formed by the aspiration.

4. A machine as defined in claim 1, wherein said drive member is formed as an elongated member, said passage which surrounds said drive member being formed as a ring passage.

5. A machine as defined in claim 1, wherein said drive member is formed as a stroke member.

6. A machine as defined in claim 5, wherein said stroke member is a lifting plunger.

7. A machine as defined in claim 1; and further comprising a tube surrounding said drive member over a longitudinal portion, said passage being formed between said tube and an outer side of said drive member.

8. A machine as defined in claim 7, wherein said tube having an inner diameter which is insignificantly greater than an outer diameter of said drive member.

9. A machine as defined in claim 7, wherein said opening of said passage is formed as a ring opening at an end of said tube.

10. A machine as defined in claim 4, wherein said ring passage is formed as a ring gap.

11. A machine as defined in claim 5, wherein said passage has a length which is greater than a maximum stroke of said drive member.

12. A machine as defined in claim 1, wherein said passage in an end region which is located opposite to said opening is sealed; and further comprising sealing means for sealing said passage in said end region.

13. A machine as defined in claim 12, wherein said sealing means include at least one sealing device which surrounds said drive member at least partially.

14. A machine as defined in claim 13, wherein said sealing device has at least one sliding ring seal.

15. A machine as defined in claim 1, wherein said passage in an end region and which proceeds by at least one sealing device has at least one additional opening through the sterilization and protective medium is aspirated through said passage.

16. A machine as defined in claim 15, wherein said additional opening opens into a ring chamber.

17. A machine as defined in claim 15; and further comprising a vacuum generator which is connectable with said opening.

18. A machine as defined in claim 17, wherein said vacuum generator is connected with said ring chamber.

19. A machine as defined in claim 1, wherein said partition is formed as a horizontal plate arranged so that at one side of said plate the unsterile region and at its other side the sterile region are located.

20. A machine as defined in claim 1, wherein said partition is formed as a vertical plate arranged so that its one side of said plate the unsterile region and at its other side the sterile region are located.

21. A machine as defined in claim 1, wherein said partition is formed as an inclined plate arranged so that its one side of said plate the unsterile region and at its other side the sterile region are located.

22. A machine as defined in claim 1, wherein said partition is formed as a plate, said unsterile region being formed as a drive region of said machine located at one side of said plate, while said sterile region is formed as a filling and closing region located on the other side of said plate.

23. A machine as defined in claim 22, wherein said drive member extends transversely to said plate.

24. A machine as defined in claim 23, wherein said drive member extends substantially perpendicular to said plate.

25. A machine as defined in claim 22, wherein said drive member extends substantially parallel to said plate.

26. A machine as defined in claim 1, wherein in the sterile region during the operation a laminar flow of said sterilization medium is produced to flow against said partition, said flow being oriented substantially parallel to a longitudinal extension of said passage and on said opening so that in said region at least a part of the protective medium is aspirated through said opening and said passage is therefore at least a low-turbulence region is provided.

27. A machine as defined in claim 1, wherein said drive member is formed as reciprocatable lifting member which is additionally turnable.

28. A machine as defined in claim 27, wherein said drive member has a tube in which a rod extends so that said tube is displaceable relative to said rod and is turnable together with said rod.

29. A machine as defined in claim 28; and further comprising a translatoraly drive engaging said tube and a turning drive engaging said rod.

30. A machine as defined in claim 1, wherein said partition is composed of a plate and a cap which is tightly arranged on said plate; and further comprising a tube tightly connected with said cap.

31. A machine as defined in claim 30, wherein said cap is substantially bell-shaped, said drive member extending substantially coaxially through said cap.

32. A machine as defined in claim 30, wherein said cap is substantially tunnel-shaped and extends with its longitudinal extension substantially parallel to said plate.

33. A machine as defined in claim 32, wherein said drive member which extends substantially parallel to said plate extends through said substantially tunnel-shaped cap and substantially parallel to a longitudinal extension of the latter.

34. A machine as defined in claim 31; and further comprising a filling and/or closing head for filling and/or closing the product, said drive member actuating said filling and/or closing head.

35. A machine as defined in claim 31; and further comprising a transporting head for transporting the product, said drive member actuating said transporting head.

* * * * *